United States Patent [19]

Pflaumer

[11] Patent Number: 4,884,266
[45] Date of Patent: Nov. 28, 1989

[54] VARIABLE SPEED LOCAL AREA NETWORK

[75] Inventor: Michael W. Pflaumer, Berkeley, Calif.

[73] Assignee: Sun Microsystems, Inc., Mountain View, Calif.

[21] Appl. No.: 230,180

[22] Filed: Aug. 9, 1988

[51] Int. Cl.$^4$ .............................................. H04J 3/22
[52] U.S. Cl. ...................................... 370/84; 375/121
[58] Field of Search ................. 375/121, 7, 8; 370/84, 370/85, 86, 94

[56] References Cited

U.S. PATENT DOCUMENTS 4,747,100  5/1988  Roach et al. ........................... 370/86
4,751,510  6/1988  de Saint Michel et al. .......... 370/84

Primary Examiner—Benedict V. Safourek
Assistant Examiner—Wellington Chin

[57] ABSTRACT

A local area network is disclosed including apparatus and methods for transmitting data between a plurality of data processing resources (agents) coupled to a cable. An agent desiring to send data to a receiving agent transmits a request to send (RTS) data packet which includes a control character requesting to either high or low speed data communication. Utilizing the teachings of the present invention, absent other predefined conditions a transmitting agent capable of high speed communication requests a high speed data exchange with the receiving agent. The RTS data packet itself is transmitted at low speed. Upon receiving the RTS packet, the receiving agent must transmit a clear to send (CTS) packet to the transmitting agent within a predetermined time after the receipt of the RTS packet. The CTS packet also includes a control character which either confirms that the data exchange will take place at high speed, or alternatively, a control character which requires a transmitting agent to use the low speed data rate. The transmitting agent, upon receipt of the CTS packet, generates and transmits a data packet to the receiving agent at either a high speed or low speed, depending upon the value of the control character with the CTS packet. The present invention further includes a status table maintained by each agent for tracking the address and communication capability of other agents coupled to the cable.

46 Claims, 5 Drawing Sheets

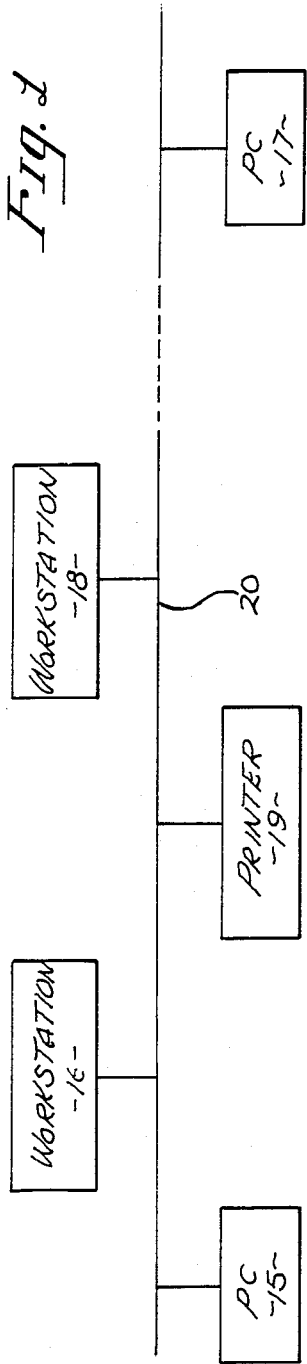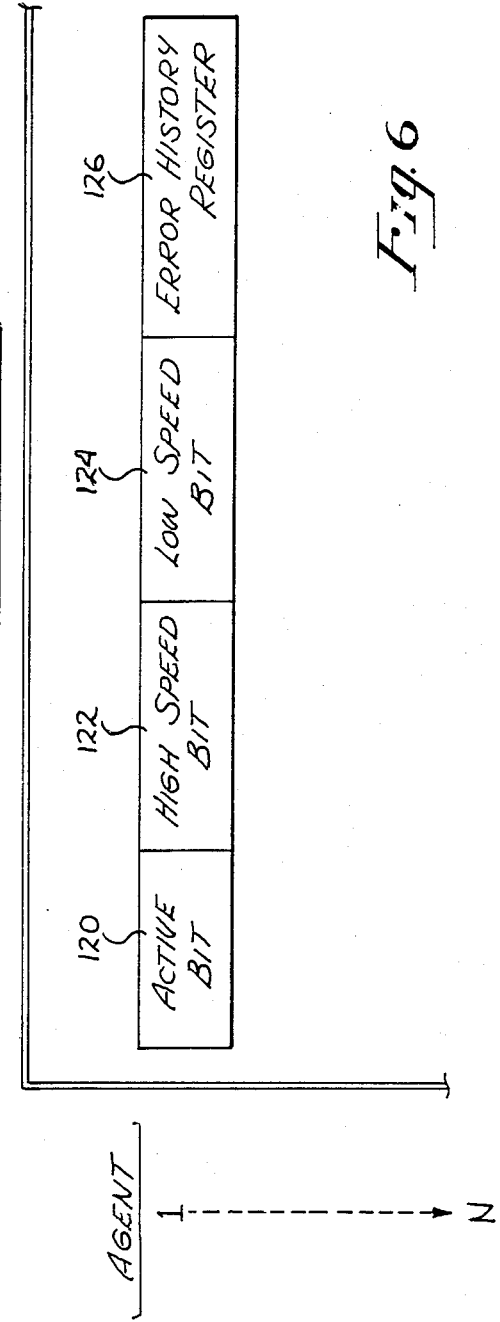

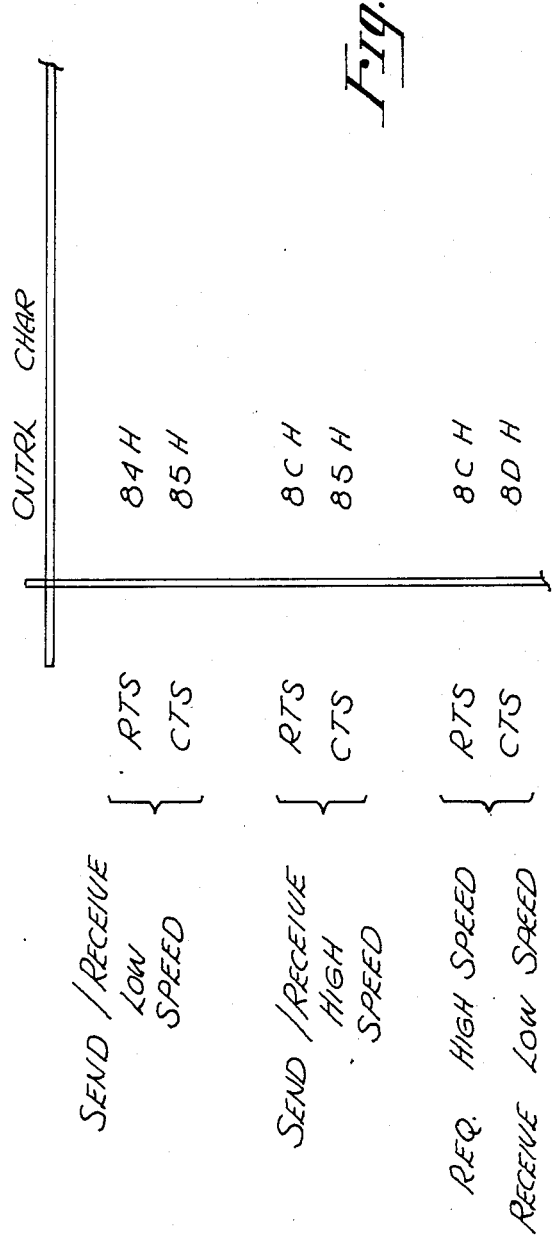

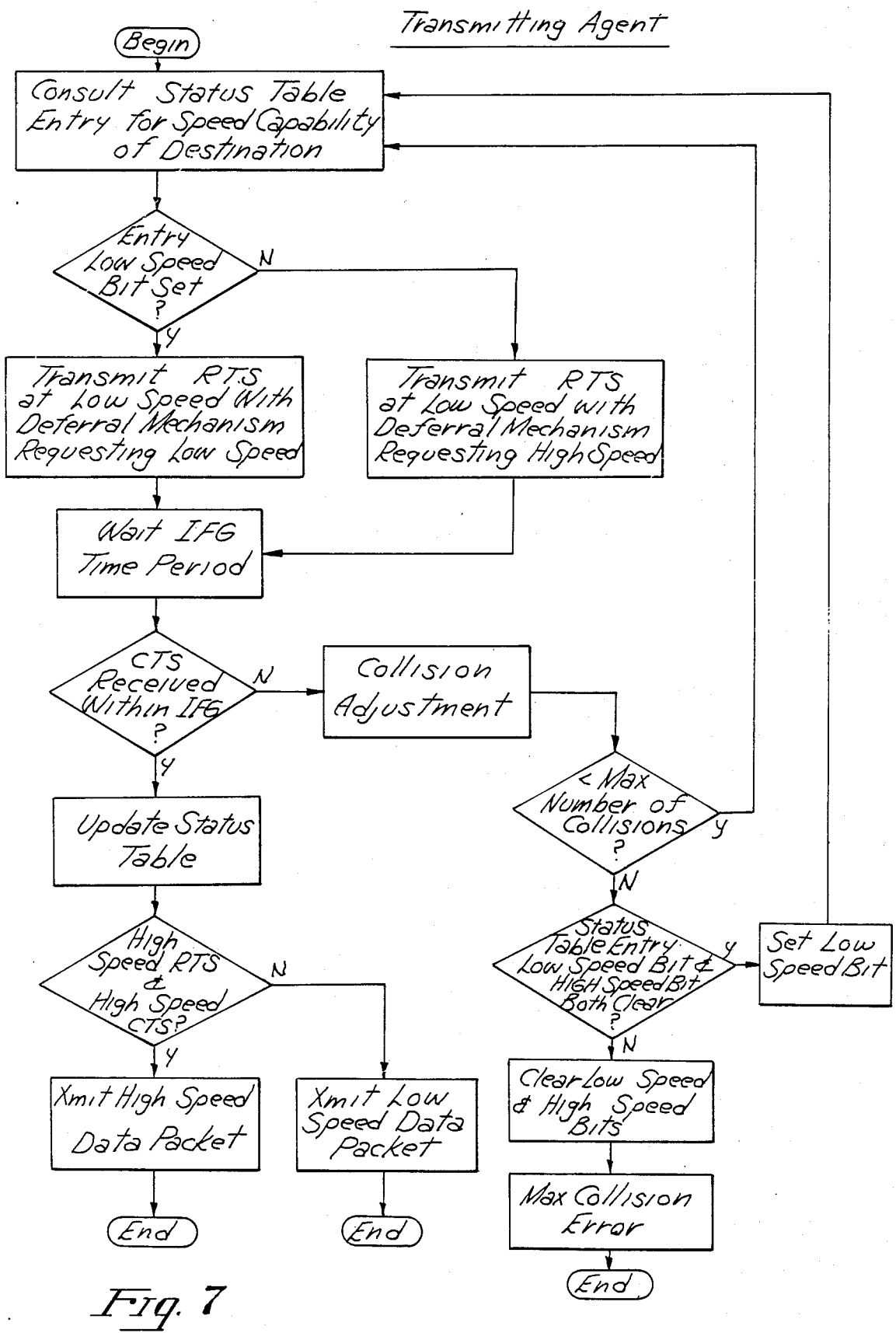

VARIABLE SPEED LOCAL AREA NETWORK

BACKGROUND OF THE INVENTION

1. FIELD OF THE INVENTION:

The present invention relates to apparatus and methods for transferring data between a plurality of data processing, and in particular, the present invention relates to data transfer over a local area network between a plurality of data processing devices.

2. ART BACKGROUND:

It is common to utilize a local area network for the transfer of data and commands between a plurality of data processing devices, such as for example, computer work stations, personal computers, printers, memories and the like. So called "Local Area Networks" (LANS) were developed to connect a collection of computers, work stations, terminals, and other peripheral devices, typically in the same building, and permit each of these devices to communicate with devices attached to other networks. By having different data processing resources perform different tasks, distributed computing provides increased efficiency and power in an overall data processing system. Most local area networks utilize their own high band width cable to permit datagram service between the various devices coupled to the LAN. The most common transmission media for carrier sense local area networks are coaxial cable, twisted pair and fiber optics. A variety of cable topologies are possible using a local area network, such as by way of example, linear, spine, tree, ring and segmented topologies.

In the personal computer market, local area networks have become quite popular as a means for providing distributed processing and communication between personal computers, work stations and other data processing resources. One such local area network is described in U.S. Pat. Nos. 4,689,786, issued August 25, 1987 and 4,661,901, issued April 28, 1987, both owned by Apple Computer, Inc. in Cupertino, California. The local area network disclosed in U.S. Pat. Nos. 4,689,789 and 4,661,902 (hereinafter "the '786 and '902 patents") provide apparatus and methods for transferring data along the local area network between data processing agents. Each agent coupled to the LAN of U.S. Pat. Nos. '786 and '902 follows a protocol for the self assignment of an address on the LAN. This network has become widely used for networking personal computers within office environments and is known as the "Appletalk TM" network. In practice, Appletalk TM operations at a speed of 230.4 kilobits per second.

As will be described, the present invention comprises improved apparatus and methods to boost the speed of communication along a local area network, and in particular, a network of the type disclosed in U.S. Pat. Nos. '786 and '902. Utilizing the teaching of the present invention, the speed of an Appletalk TM local area network may be increased by a factor of 3.33. In addition, the present invention provides both high speed, as well as low speed, data communication along a LAN between various types of computers, work stations, printers, disk drives and other data processing agents. The present invention provides a high speed and reliable local area network heretofore unknown in the prior art.

SUMMARY OF THE INVENTION

A local area network is disclosed including apparatus and methods for transmitting data between a plurality of data processing resources (agents) coupled to a cable. An agent desiring to send data to a receiving agent transmits a reguest to send (RTS) data packet which includes a control character requesting either high or low speed data communication. Utilizing the teachings of the present invention, absent other predefined conditions a transmitting agent capable of high speed communication requests a high speed data exchange with the receiving agent. The RTS data packet itself is transmitted at low speed. Upon receiving the RTS packets, the receiving agent must transmit a clear to send (CTS) packet to the transmitting agent within a predetermined time after the receipt of the RTS packet. The CTS packet also includes a control character which either comfirms that the data exchange will take place at high speed, or alternatively, a control character which requires a transmitting agent to use the low speed data rate. The transmitting agent, upon receipt of the CTS packet, generates and transmits a data packet to the receiving agent at either a high speed or low speed, depending upon the value of the control character within the CTS packet. The present invention further includes a status table maintained by each agent for tracking the address and communication capability of other agents coupled to the cable. The status table maintained by each agent further includes an error history register for each other agent in which is maintained the error status of the last N high speed data packet communications with that agent. In the event the number of errors over N past high speed data communications from a given agent exceed a predetermined threshold value, the receiving agent requires that the agent communicate with it at low speed. In addition, if the receiving agent detects an error in a high speed data packet transmitted to it, the receiving agent enables a slow down timer which, for a predetermined number of seconds, requires all transmitting agent in communication with the receiving agent operate at low speed. Accordingly, the present invention provides a method for operating a local area network at high speed for those agents capable of high speed, and at low speed for those agents capable of only low speed communication.

BRIEF DESCRIPTION OF THE DRAWINGS

FIG. 1 illustrates a local area network utilizing the teachings of the present invention.

FIG. 2 illustrates the frame format utilized by the present invention for a request to send (RTS) and clear to send (CTS) message packet.

FIG. 3 illustrates the present invention's control character allocation for use in RTS and CTS message packets to provide both low speed and high speed data communication along a local area network.

FIG. 6 conceptually illustrates the present invention's use of a status table for each agent coupled to the local area network.

FIG. 7 is a flow chart illustrating the sequence of operations completely by a transmitting agent utilizing the teachings of the present invention.

DETAILED DESCRIPTION OF THE INVENTION

Figures 4, 5:
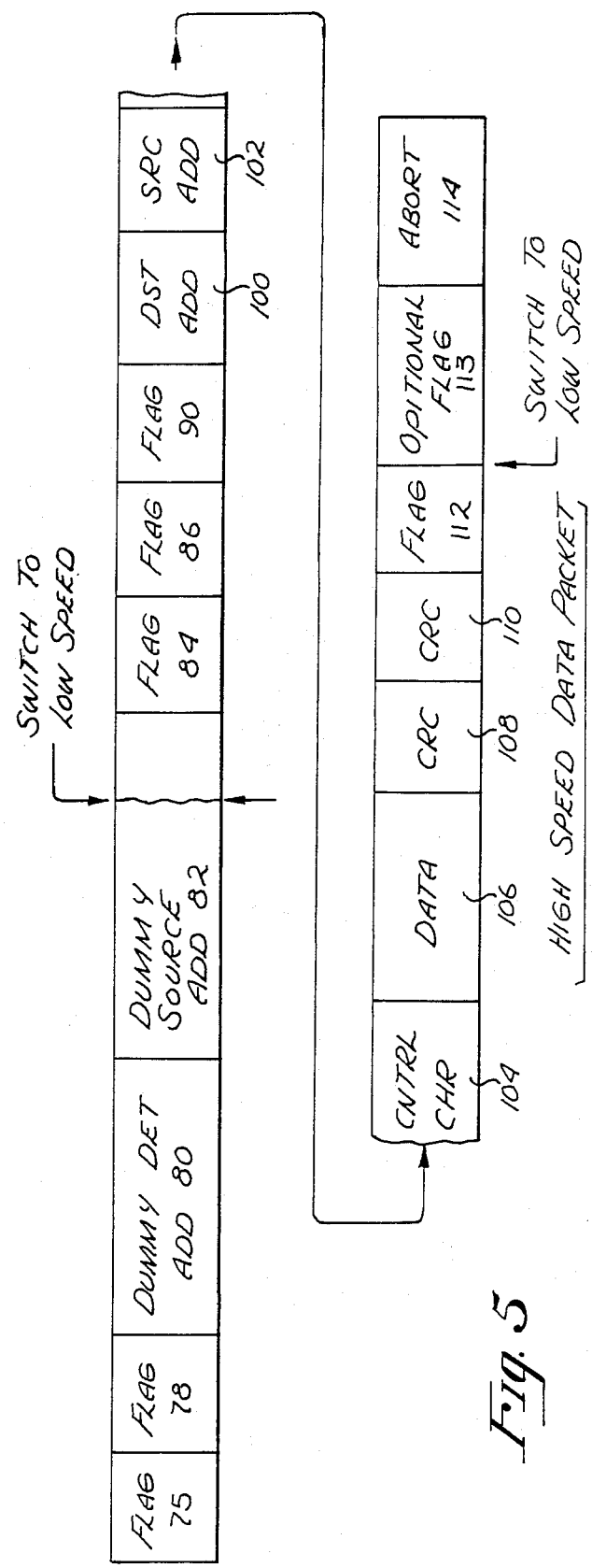
FIG. 4 illustrates the frame format for a low speed data packet utilizing the teachings of the present invention.
FIG. 5 illustrates the frame format for a high speed data packet untilized by the present invention.

A local area network including apparatus and methods for transferring data between a plurality of data processing resources coupled to a common cable is disclosed. In the following description, for purposes of explanation, specific numbers, bytes, registers, addresses, times, signals and data message formats, ect. are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily.

Referring to FIG. 1, the present invention may include a plurality of data processing devices identified generally by the numerals 15 through 18 as well as periphery devices, such as printer 19, or other devices, such as global disk drives, modems, and the like. For purposes of this disclosure and Specification, all data processing and peripheral devices which are coupled to the present invention's local area network are collectively referred to as "agents". As shown, data processing devices 15, 16, 17, 18 and printer 19 are interconnected for data transfer to one another by a common cable 20. The various devices are coupled to cable 20 using well known techniques and circuits. Cable 20 is appropriately terminated to eliminate signal reflections. It will be appreciated that cable 20 may comprise any shared media, such as coaxial cable, fiber optics, radio channel, twisted pair and the like. Since, in the present embodiment, the agents are passively coupled to cable 20, a failure of an agent will not disrupt communication over cable 20. For purposes of this Specification, the present invention is described generally utilizing the structure, protocols, and methods disclosed in U.S. Pat. No. 4,689,786, issued on August 25, 1987, and U.S. Pat. No. 4,661, 902, issued April 28, 1987. However, it will be appreciated by one skilled in the art that the present invention has application beyond the improvements disclosed herein relative to the network described in the '786 and '902 patents.

As will be described, the present invention provides a local area network which permits synchronous serial communication and data transfer between data processing devices 15 through 18, and other peripheral devices, such as printer 19, utilizing protocols which permit both high speed and low speed communication between agents. In the present embodiment, it is contemplated that some agents coupled to cable 20 may only be capable of low speed communication, while other agents may communicate at both high and low speed. Moreover, it is further assumed that the agents, such as personal computer (PC) 15 and work station 16 are utilizing different central processing units (CPU) and are manufactured by different manufacturers.

Referring now to FIG. 2, the present invention utilizes predefined message "frames" (also referred to as "packets") for a handshake protocol known as a request to send (RTS) and clear to send (CTS). In the art, a "frame" typically refers to a plurality of bytes comprising a packet. The RTS/CTS packets includes a preamble consising of two or more synchronization ("flag") bytes 25 and 26. Presently, each synchronization byte comprises the bits 0 1 1 1 1 1 1 0, as in the case of the network disclosed in U.S. Pat. Nos. '786 and '902. Each synchronization byte 25 and 26 permit receiving data processing agents coupled to cable 20 to synchronize their receiving cicuits, and to receive necessary clock information through the use of FM-O encoding. Following the synchronization bytes 25 and 26, is an eight bit destination address 30 which specifies the address of the receiving data processing agent for which the frame is intended. A source address 32 comprises an eight bit address of the data processing agent transmitting the packet. A control character 36 follows the source address 32, and specifies the type of frame which is trasmitted through the use of various control character codes, as will be described. In the presently preferred embodiment, the control character 36 may designate whether the communication between agents coupled to bus 20 is to be conducted at high speed or at low speed. The control character 36 is followed by two eight bit octets or bytes of cyclic redundancy code (CRC) 38 and 40, which, in the presently preferred embodiment utilizes the standard CRC-CCITT polynomial (as does the system of Patents '786 and '902). The CRT bytes 38 and 40 are followed by an eight bit synchronization flag trailer 42, and an abort sequence 46 which is used to delineate the end of the packet to agents coupled to cable 20.

Referring now to FIG. 4, the present invention's low speed data packet is illustrated. As in the case of the RTS/CTS packet of FIG. 2, the low speed data packet includes two eight bit flags 50 and 52, as well as a destination address 54, source address 56, and control character 60. Following control character 60, is a multibyte data field 62 which may contain raw data, messages, commands, and the like to be transmitted between the agents coupled to cable 20. As illustrated, the low speed data packet further includes two eight bytes of cyclic redundancy code (CRC) 64 and 68, a closing flag 69, as well as an abort sequence 70. It will be appreciated that the low speed data packet of FIG. 4 is substantially the same packet as illustrated in FIG. 3 of '786 and '902.

Referring now to FIG. 5, the present invention's unique high speed data packet is illustrated. The high speed data packet includes synchronization flags 75 and 78 which are followed by a "dummy" destination address 80. A "dummy" source address 82 follows the "dummy" destination address 80, as illustrated in the FIG. The present invention uitilzes the "dummy" destination and source addresses (where the addresses used comprise either illegal characters, or non-existent addresses) in order to be compatible with the local area network protocol disclosed in Patents '786 and '902. Since the present invention is an improvement upon, and compatible with, the LAN of patents '786 and '902, and permits data processing agents which utilize only the protocols disclosed in these patents to be coupled to cable 20 of the present invention, the "dummy" addresses are required to provide a proper notification to such agents (not utilizing the teachings of the present invention) that cable 20 is in use. In accordance with the methods of the present invention, prior to the complete transmission of the "dummy" source address 82, the transmitting agent switches to a high speed data transfer rate (presently 768 kilobits per second) and transmits three consecutive flag bytes 84, 86, and 90. A legitimate destination address 100 follows flag byte 90, as well as a legitimate source address 102 and a control character 104. Following the control character 104 are one or more bytes of data 106, in the form of raw data, commands, and the like. A two byte CRC code 108 and 110 follows data 106. Following CRC 110 is a flag byte 112. In accordance with the teachings of the present invention, subsequent to the transmission of flag byte 112 the transmitting agent switches to a low speed (presently 230.4 kilobits per second) and transmits an optional flag 113 and a final abort sequence 114. For those agents able to communicate only in accordance with the teachings of patents '786 and '902, the transmission of flags 75 and 78, dummy destination address 80 and dummy source address 82, acts as a notification to those agents that cable 20 is in use. Subsequent bytes (flags 84, 86, 90, destination address 100, source address 102, control character 104, data 106, CRCs 108 and 110, and flag 112) are unintelligible to agents utilizing only the teachings of the '768 and '902 patents. However, the transmission of the abort sequence 114 at the low speed is understandable to those agents operating only under the teachings of the '786 and '902 patents, and indicates that the cable 20 is no longer in use.

Referring now to FIG. 6, each agent coupled to cable 20 maintains a status table for all other agents coupled to the cable. The status table entry for each other agent includes an active bit 120, a high speed bit 122, low speed bit 124, as well as an error history register 126 (presently five bits) which is updated to keep track of successful high speed communications as well as communications resulting in errors. When an agent is initially coupled to cable 20, a self assigned address sequence is followed in order to assign an address on the cable 20 to the agent (see the methodology disclosed in U.S. Pat. No. 4,68.,786). For all status table entries, the initial condition for the active, high speed low speed, and last five high speed error bits is clear, equivalent to no activity since nothing is known about the speed capability of the other agents on cable 20, and no error history exists.

Each attempt made by a transmitting agent to send data to a receiving agent results in the active bit 120 being set (high) by the transmitting agent. In addition, each time a packet is successfully received from an agent, the receiving agent also sets the active bit 120. In the presently preferred embodiment, a receive with an error does not result in the setting of active bit 120. The setting of active bit 120 simply means that another agent (the transmitting agent) is now known to exist at the source address defined by the received packet. However, no other capabilities of the sending agent are known. In addition, in the presently preferred embodiment, an aging timer is provided (presently set at two minutes) such that the entire status table is examined for each agent after a predetermined period of time (X). If the active bit 120 for an agent is set, it is then cleared after the predetermined time X has elapsed. If both the active bit 120, high speed bit 122 and low speed bit 124 are set (meaning that the agent at that address is active, high speed capable but using low speed), the low speed bit 124 is also cleared by the aging timer. If the active bit 120 for an agent is clear, meaning that there have been no packets sent to, or received from the agent for that address during the predetermined time period (X), the agent's entry is cleared completely, including its error history information in error history register 126. It will be appreciated that this is equivalent to removing the agent's entry from the table. Accordingly, normal activity between one agent and another will keep its the status table entry active, but a prolonged period of silence will cause the information stored in the status table for a particular agent to be discarded. Since the network disclosed in U.S. Pat. No. 4,689,786 permits the dynamic reallocation of addresses (by for example, removing an agent from cable 20 and reconnecting at another location, or at a later time), the information in the status table must be continually revised in order to keep it valid.

The setting of high speed bit 122 indicates that the agent at the respective address is capable of communicating at high speed using the protocol of the present invention. The high speed bit 122 is set upon the successful reception of an RTS or CTS packet in which the control character 36 comprises a code indicating that the data transfer could be at high speed [see FIG. 3: presently the control values are 8CH for an RTS, and 85H (or 8DH in response to an 8CH RTS) for a CTS], regardless of the actual data speed of the transmission. In other words, if an agent requests to send data to another agent at high speed, and the receiving agent understands the request, both agents must have high speed capability. The high speed bit 122 is also set provisionally in the case of the first time when an attempt is made to send to an agent whose status is unknown (both the high speed bit 122 and low speed bit 124 being clear). If an attempt fails, then the high speed bit 122 is cleared, the low speed bit 124 is set, and the transmitting agent makes another attempt to contact the receiving agent.

The low speed bit 124 indicates that the agent at the associated address should be communicated with using low speed. If the high speed bit 122 is clear, and the low speed bit 124 is set, this indicates that the associated agent may only be communicated with at low speed. If the high speed bit 122 is set, and the low speed bit 124 is set, this state indicates that excessive errors have been detected in high speed data packets originating from this agent, and therefore, low speed communication must be used. The low speed bit 124 is set by a receiving agent if it receives an RTS packet requesting to send data at low speed from a transmitting agent (a so called broadcast "packet" is always sent at low speed in accordance with the teachings of the present invention, and therefore the receipt of a broadcast packet does not result in the setting of the low speed bit 124). The low speed bit 124 is cleared if a receiving agent (capable of high speed) receives a packet with a high speed RTS control character 36. The low speed bit 124 is also set after there has been detected an error in a high speed data packet, if there have been more than a predetermined number of errors in the last N high speed data frames (presently if there have been more than three errors within the last six high speed frames). The low speed bit 124 is also cleared by the aging timer in the case where the high speed bit 122 is set. The clearing of the low speed bit 124 in this fashion results in a periodic attempt by the transmitting agent to use high speed. The low speed bit 124 is also set if the first attempt to send at high speed to an unknown agent fails.

For each agent entry in the status table there is a history of the success/failure of the last N high speed data frames received. This history is recorded by the error history bit register 126. Only frames in which the data actually was sent at high speed are counted by the register, and the only errors which are counted are those in the high speed frames. Receiving an error in a high speed data frame results in the error register 126 being checked, and if there have been more than a predetermined number of errors in the last N frames, the low speed bit 124 is set, as discussed above. Referring now to FIG. 7, the sequence of operations which a transmitting agent performs to transmit data to a receiving agent on cable 20 as illstrated. An agent (for example, work station 16) desiring to transmit data to another agent [for example, personal computer (PC)] 17 over cable 20 initially transmits a request to send (RTS) low speed data packet (see FIG. 2) to the receiving agent (in the present example PC 17). In accordance with the teachings of the present invention, if the transmitting agent is capable of high speed, it will initially attempt to establish communication with the receiving agent at high speed if the speed capability of the receiving agent is not known. (If the speed of the receiving agent is known, then that speed is used.) In accordance with the presently preferred embodiment, the transmitting agent, work station 16, will utilize a value of 8C (hexidecimal) for control character 36, thereby indicating to the receiving agent, PC 17, that the communication request is for a high speed data transfer. It will be noted, however, that the RTS packet itself is transmitted by the transmitting agent is sent at low speed (presently 230.4 kilobits per second). Subsequent to the transmission of the RTS packet, the transmitting agent waits an inter-frame gap (IFG) time period, for the receipt of a clear to send (CTS) packet transmitted by the receiving agent (PC 17 in the present example), also at low speed. In accordance with the local area network disclosed in U.S. Pat. Nos. '786 and '902, a transmitting agent must receive a CTS packet within the IFG period to complete the initial handshake protocol for data transfer.

If the transmitting agent does not receive a CTS packet over cable 20 from the receiving agent within the IFG period, this condition may be the result of either an error on cable 20, or alternatively, that the receiving agent is incapable of utilizing the control character 36 requesting high speed communication. This situation may exist in those cases where agents incorporating the teachings of the present invention are coupled to a cable or other medium comprising a local area network as disclosed in U.S. Pat. Nos. '786 and '902, whose agents do not have the high speed capabilities of the present invention as disclosed herein. In any case, the failure to receive a CTS is treated as a collision, and the sending agent follows the collision algorithm, as disclosed in U.S. Pat. Nos. '786 and '902, and retries the RTS.

As illustrated in FIG. 7, if the speed capability of the receiving agent was unknown, a failure to receive a CTS packet within the IFG period after retrying for the maximum number of collisions results in the retransmission of an RTS packet by the transmitting agent at low speed, with a control character 36 which requests a low speed data exchange. As shown, the transmitting agent once again waits to receive a CTS packet from the receiving agent within the IFG period. In the event that a CTS packet is received within the IFG period, the transmitting agent generates and transmits a low speed data packet (see FIG. 4) to the receiving agent. However, if a CTS packet is not received by the transmitting agent, despite the request for a low speed communication, then the transmitting agent proceeds to execute a collision adjustment sequence of operations disclosed in U.S. Pat. Nos. '786 and '902. Upon the successful transmission of the low speed communication, the data transfer is complete, and the status table entry is set to low speed (i.e., low speed bit set and high speed bit clear). However, continued failures results in a general error condition (possibly the result of a broken cable rendering communication physically impossible), and the status table entry is set to speed unknown (i.e., both low speed and high speed bits cleared). If the initial attempt to send at high speed succeeds, and the receiving agent returns a CTS, then the status table entry is set to high speed (high speed bit set, low speed bit clear) and the data packet is sent at the speed appropriate to the CTS.

Figure 8:
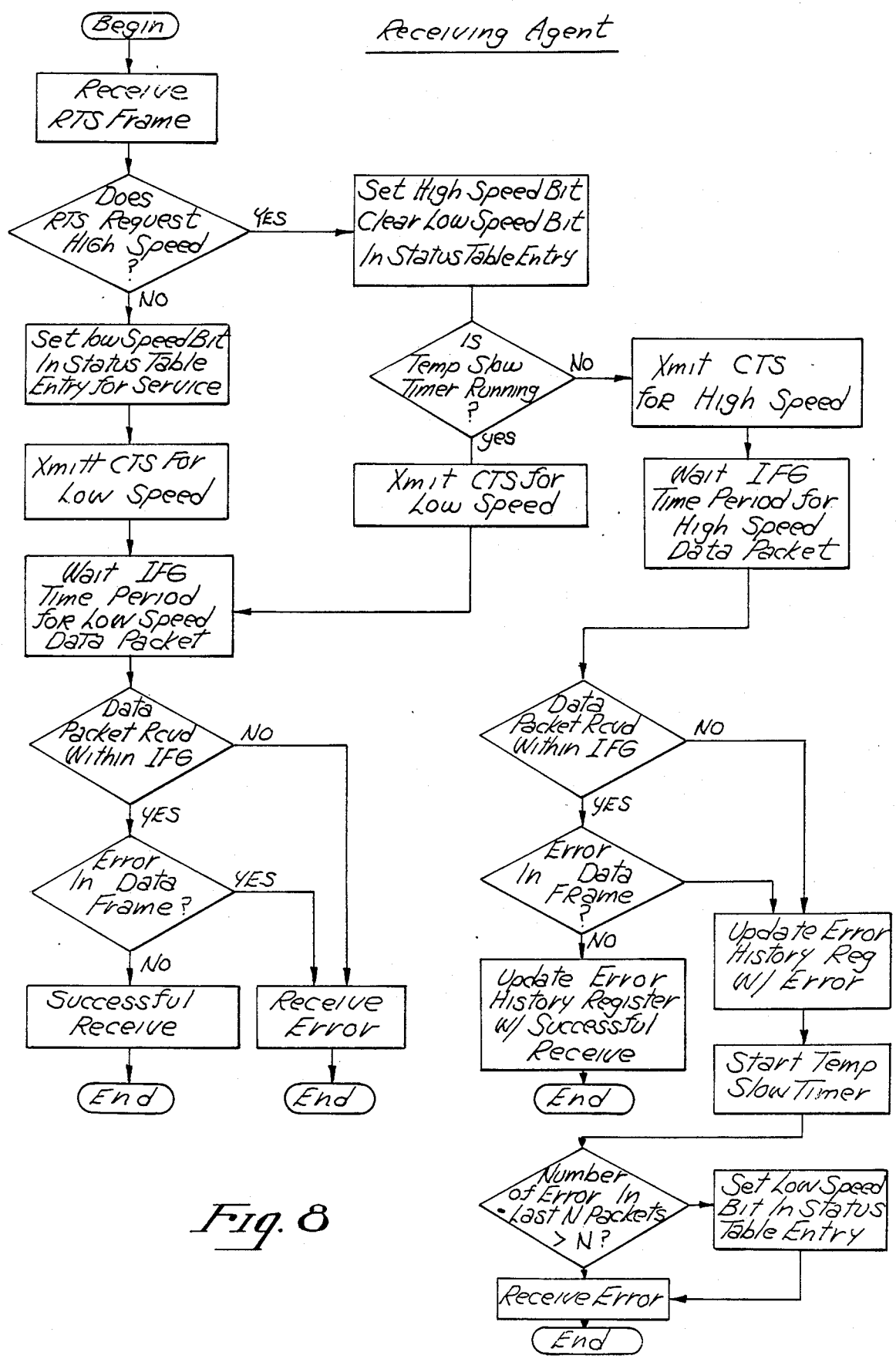
FIG. 8 is a flow chart illustrating the sequence of operations by a receiving agent utilizing the teachings of the present invention.

Referring now to FIG. 8, the sequence of operations completed by a receiving agent is illustrated in flow chart form. Assume for sake of example that PC 15 transmits an RTS packet (in accordance with the sequence of steps illustrated in FIG. 7) to work station 16 (see FIG. 1). Upon receipt of the RTS packet transmitted by work station 16, the receiving agent (PC 15) examines control character 36 of the RTS packet to determine whether or not a high speed data transmission is requested. If the transmitting agent (work station 16) requests only low speed communication (presently represented by a control character of 84H), the receiving agent marks its status table entry as low speed, and transmits a CTS packet having a control character 36 which represents an acknowledgement for low speed communication (presently an 85H). The receiving agent then awaits the receipt of a low speed data packet (see FIG. 4) within the IFG period, and if received, the data communication is completed. In the event that a low speed data packet is not received within the IFG period, the receiving agent recovers and awaits the arrival of the next RTS. (See U.S. Pat. Nos. '786 and '902 for a description of the subsequent retry sequence of operations).

In the event the RTS packet requests high speed data communication, the receiving agent marks its status table entry as high speed, and determines whether or not it will receive at high speed. If the particular receiving agent is incapable of receiving and transmitting at high speed then the RTS for high speed will be ignored. If the receiving agent is capable of transmitting and receiving at high speed, then the receiving agent determines if the slow down timer has been set. The present invention includes the use of a slow down timer which is set by the receiving agent for a period of X seconds after an error has occurred in the receipt of a previous data packet. For example, if receiving agent PC 15 experienced an error in the previous packet received from transmitting agent work station 16, the receiving agent sets an internal slow down timer which results in a low speed CTS packet being returned for any RTS packets received within the predetermined time period. It will be appreciated, that the effect of the slow down timer is to force communication between transmitting agents and the particular receiving agent to be conducted at low speed during the predetermined time period.

In the event that the slow down timer has not been set, then the receiving agent (PC 15) transmits a CTS packet to the transmitting agent with the control character indicating that high speed communication is to proceed. The receiving agent then waits to receive a high speed data packet (see FIG. 5), which if successfully received within the IFG period, terminates the communication between the transmitting and receiving agents and the error history register is updated. In the event that a valid high speed data packet is not received within the IFG period, or the packet received is in error, the receiving agent updates the error history register 126, enables the low speed slow down timer, and compares the number of high speed errors in the last N high speed packets to a threshold M. If the number exceeds the threshold, the status table entry for the agent is marked as use low speed (i.e, its low speed bit is set). The receiving agent then awaits the receipt of any subsequent RTS packet.

Accordingly, apparatus and methods have been disclosed having particular utility for use in a local area network to permit both high speed and low speed communication among a variety of agents. The present invention's methods and apparatus are compatible with existing local area networks such as the network described in U.S. Pat. Nos. '786 and '902, but may be equally utilized in conjunction with other network protocols. Although the present invention has been described with reference to FIGS. 1-8, it will be apparent to one skilled in the art that the present invention has utility far exceeding that disclosed in the figures. It is contemplated that many changes and modifications may be made, by one of ordinary skill in the art, without departing from the spirit and scope of the invention as disclosed herein.

I claim:

1. A method for transferring data on a communication medium between a plurality of data processing devices ("agents"), including a sending agent and a receiving agent, comprising the steps of:
    said sending agent transmitting a first signal(RTS) to said receiving agent coupled to said data communication medium at a first speed;
    said receiving agent receiving said first signal and generating a second signal(CTS), said second signal including an CTS control character corresponding to a speed for data transfer over said medium, said receiving agent transmitting said control signal on said medium to said sending agent;
    said sending agent receiving said second signal and transmitting a data packet to said receiving agent at the speed which corresponds to said CTS control character;
    whereby data is transfer between said sending and receiving agents coupled to said communication medium.

2. The method as defined in claim 1, wherein said second signal is transmitted to said sending agent at said first speed.

3. The method as defined by claim 2, wherein said plurality of speeds includes a low and a high speed.

4. The method as defined by claim 3, wherein said first speed is said low speed.

5. The method as defined by claim 4, wherein said first signal (RTS) includes a control character which corresponds to a requested speed for data transfer over said medium.

6. The method as defined by claim 5, wherein said control character in said RTS signal comprises a value corresponding to a high speed.

7. The method as defined by claim 6, wherein if said receiving agent is capable of high speed data transfer, said CTS signal control character comprises a value corresponding to said high speed requested by said RTS control character.

8. The method as defined by claim 7, wherein if said receiving agent is only capable of said low speed, said CTS signal control character comprises a value corresponding to said low speed despite said high speed requested by said RTS control character.

9. The method as defined by claim 8, wherein said sending agent transmits said data packet to said receiving agent at said low speed.

10. The method as defined by claim 7, wherein said sending agent transmits said data packet to said receiving agent at said high speed.

11. The method as defined by claim 7, wherein each of said agents are assigned a unique address on said data communication medium.

12. The method as defined by claim 11, further including the step of said receiving agent maintaining a status table, said status table including at least one active bit, said active bit set by said receiving agent upon its receipt of an RTS signal, the setting of said active bit indicating that said sending agent is active at its unique address on said medium.

13. The method as defined by claim 12, wherein said status table further includes at least one high speed bit and at least one low speed bit, said high speed bit being set by said receiving agent upon the receipt of an RTS signal including a control character having a value corresponding to high speed, the setting of said high speed bit indicating that said sending agent is capable of high data communication.

14. The method as defined by claim 13, wherein said low speed bit is set by said receiving agent upon the receipt of an RTS signal including a control character having a value corresponding to low speed, the setting of said low speed bit resulting in said sending and receiving agent communicating over said medium only at said low speed.

15. The method as defined by claim 14, wherein said status table further includes error history register means for storing a value corresponding to the number of errors in the last N data communications between said sending and receiving agents at said high speed.

16. The method as defined by claim 15, further including slow down timer means coupled to said receiving agent for setting a temporary use low speed bit for a predetermined time (X) in the event of an error in data communications between said sending and receiving agents, thereby resulting in all communications to said receiving agent being at low speed.

17. The method as defined by claim 15, further including aging timer means coupled to said receiving agent for clearing said active, high speed and low speed bits in the event said bits are not re-set after a predetermined aging period (M), such that all entries older than time M are cleared from said status table.

18. The method as defined by claim 15, further including the step of setting said low speed bit if said error history register means has recorded more than a predetermined number of errors in the last N high speed data communications, said low speed bit remaining set until said number of successful high speed data communications between said sending and receiving agents exceeds said predetermined number.

19. The method as defined by claim 3, wherein said low speed data packet includes:
    a flag byte;
    a destination address corresponding to the address of said receiving agent on said medium;
    a source address corresponding to the address of said sending agent on said medium;
    a data control character;
    a plurality of data bytes;
    a cyclic redundancy code for detecting errors
    a flag byte;

a abort byte.

20. The method as defined by claim 3, wherein said high speed data packet includes:
   at least one first flag byte;
   a dummy destination address;
   a dummy source address;
   at least one second flag byte;
   a destination address corresponding to the address of said receiving agent;
   a source address corresponding to the address of said sending agent;
   a data control character;
   a plurality of data bytes;
   a cyclic redundancy code for detecting errors;
   a third flag byte;
   an abort byte.

21. The method as defined by claim 20, wherein said dummy destination and source addresses comprise nonexistent address on said communication medium.

22. The method as defined by claim 20, wherein said at least one first flag byte, said dummy destination address, at least a portion of said dummy source address, and said abort byte are transmitted at said low speed 23. The method as defined by claim 22, wherein said second flag byte, said source address, said destination address, said data control character, said plurality of data bytes, said cyclic redundancy code, and said third flag byte are transmitted at said high speed.

24. In a data communication system having a communications medium coupled between a plurality of data processing devices ("agents"), including a sending agent and a receiving agent, an apparatus for transferring data between said agents, comprising:
   transmitting means coupled to each agent to permit said sending agent to transmit a first signal(RTS) at a first speed from said sending agent to said receiving agent coupled to said communications medium;
   receiving means coupled to each agent to permit said receiving agent to receive said first signal and generate a second signal (CTS), said second signal including an CTS control character corresponding to a speed for data transfer over said medium, said receiving agent transmitting said second signal on said medium to said sending agent;
   data packet generation means coupled to each agent to permit said sending agent receiving said second signal to generate and transmit a data packet to said receiving agent at the speed which corresponds to said CTS control character;
   whereby data is transferred between said sending and receiving agents coupled to said communication medium.

25. The apparatus as defined in claim 24, wherein said second signal is transmitted to said sending agent at said first speed.

26. The apparatus as defined by claim 25, wherein said plurality of speeds includes a low and a high speed.

27. The apparatus as defined by claim 26, wherein said first speed is said low speed.

28. The apparatus as defined by claim 27, wherein said first signal (RTS) includes a control character which corresponds to a requested speed for data transfer over said medium.

29. The apparatus as defined by claim 28, wherein said control character in said RTS signal comprises a value corresponding to a high speed.

30. The apparatus as defined by claim 29, wherein if said receiving agent is capable of high speed data transfer, said CTS signal control character comprises a value corresponding to said high speed requested by said RTS control character.

31. The apparatus as defined by claim 30, wherein if said receiving agent is only capable of said low speed, said CTS signal control character comprises a value corresponding to said low speed despite said high speed requested by said RTS control character.

32. The apparatus as defined by claim 31, wherein said sending agent transmits said data packet to said receiving agent at said low speed.

33. The apparatus as defined by claim 30, wherein said sending agent transmits said data packet to said receiving agent at said high speed.

34. The apparatus as defined by claim 30, wherein each of said agents are assigned a unique address on said data communication medium.

35. The apparatus as defined by claim 34, further including status table means coupled to said receiving agent for maintaining a status table, said status table including at least one active bit, said active bit being set by said receiving agent upon its receipt of an RTS signal, the setting of said active bit indicating that said sending agent is active at its unique address on said medium.

36. The apparatus as defined by claim 35, wherein said status table further includes at least one high speed bit and at least one low speed bit, said high speed bit being set by said receiving agent upon the receipt of an RTS signal including a control character having a value corresponding to high speed, the setting of said high speed bit indicating that said sending agent is capable of high speed data communication.

37. The apparatus as defined by claim 36, wherein said low speed bit is set by said receiving agent upon the receipt of an RTS signal including a control character having a value corresponding to low speed, the setting of said low speed bit resulting in said sending and receiving agent communicating over said medium only at said low speed.

38. The apparatus as defined by claim 37, wherein said status table means further includes error history register means for storing a value corresponding to the number of errors in the last N data communications between said sending and receiving agents at said high speed.

39. The apparatus as defined by claim 38, further including slow down timer means coupled to said receiving agent for setting a temporary use low speed bit for a perdetermined time (X) in the event of an error in data communications between said sending and receiving agents, thereby resulting in all communications to said receiving agent being at low speed.

40. The apparatus as defined by claim 38, further including aging timer means coupled to said receiving agent for clearing said active, high speed and low speed bits in the event said bits are not re-set after a predetermined aging period (M), such that all entries older than time M are cleared from said status table.

41. The apparatus as defined by claim 38, wherein said low speed bit is set if said error history register means has recorded more than a predetermined number of errors in the last N high speed data communications, said low speed bit remaining set until said number off successful high speed data communications between said sending and receiving agents exceeds said predetermined number.

42. The apparatus as defined by claim 26, wherein said low speed data packet includes:
- a flag bytes;
- a destination address corresponding to the address of said receiving agent on said medium;
- a source address corresponding to the address of said sending agent on said medium;
- a data control character;
- a plurality of data bytes;
- a cyclic redundancy code for detecting errors;
- a flag byte;
- a abort byte.

43. The apparatus as defined by claim 26, wherein said high speed data packet includes:
- at least one first flag bytes;;
- a dummy destination address;
- a dummy source address;
- at least one second flag bytes;
- a destination address corresponding to the address of said receiving agent;
- a source address corresponding to the address of said sending agent;
- a data control character;
- a plurality of data bytes;
- a cyclic redundancy code for detecting errors;
- a third flag bytes;
- an abort byte.

44. The apparatus as defined by claim 43, wherein said dummy destination and source addresses comprise non-existent address on said communication medium.

45. The apparatus as defined by claim 43, wherein said at least one first flag byte, said dummy destination address, at least a portion of said dummy source address, and said abort byte are transmitted at said low speed.

46. The apparatus as defined by claim 45, wherein said second flag byte, said source address, said destination address, said data control character, said plurality of data bytes, said cyclic redundancy code, and said third flag byte are transmitted at said high speed.

* * * * *

UNITED STATES PATENT AND TRADEMARK OFFICE
CERTIFICATE OF CORRECTION

PATENT NO. : 4,884,266

DATED : 11/28/89

INVENTOR(S) : Pflaumer

It is certified that error in the above-identified patent and that said Letters Patent is hereby corrected as shown below:

| | | |
|---|---|---|
| col. 01, line 08 | after "processing" | insert --devices-- |
| col. 01, line 38 | delete "1987and" | insert --1987,and-- |
| col. 01, line 40 | delete "4,689,789" | insert --4,689,786-- |
| col. 02, line 02 | delete "reguest" | insert --request-- |
| col. 02, line 07 | delete "excharge" | insert --exchange-- |
| col. 02, line 14 | delete "comfirms" | insert --confirms-- |
| col. 02, line 37 | delete "agent" | insert --agents-- |
| col. 02, line 59 | delete "untilized" | insert --utilized-- |
| col. 02, line 64 | delete "completely" | insert --completed-- |
| col. 03, line 09 | delete "ect." | insert --etc.-- |
| col. 03, line 20 | delete "periphery" | insert --peripheral-- |
| col. 03, line 64 | delete "packets" | insert --packet-- |
| col. 04, line 03 | delete "cicuits" | insert --circuits-- |
| col. 04, lines 11-12 | delete "trasmitted" | insert --transmitted-- |
| col. 04, line 21 | delete "CRT" | insert --CRC-- |
| col. 04, line 35 | after "eight" | insert --bit-- |
| col. 04, line 39 | after "of" | insert --Patents-- |
| col. 04, line 46 | delete "uitilzes" | insert --utilizes-- |
| col. 05, line 15 | delete " '768 " | insert --'786-- |
| col. 05, line 31 | delete "4,68.,786" | insert --4,689,786-- |
| col. 07, line 03 | delete "illstrated" | insert --illustrated-- |

UNITED STATES PATENT AND TRADEMARK OFFICE
CERTIFICATE OF CORRECTION

PATENT NO. : 4,884,266

DATED : 11/28/89

INVENTOR(S) : Pflaumer

It is certified that error in the above-identified patent and that said Letters Patent is hereby corrected as shown below:

| | | |
|---|---|---|
| col. 09, line 13 | delete "conjuntion" | insert --conjunction-- |
| col. 09, line 23 | before "communication" | insert --data-- |
| col. 09, line 35 | delete "control" | insert --second-- |
| col. 09, line 41 | delete "transfer" | insert --transferred-- |
| col. 10, line 13 | after "bit" (2nd occurrence) | insert --being-- |
| col. 10, line 24 | after "high" | insert --speed-- |
| col. 13, line 03 | delete "bytes" | insert --byte-- |
| col. 13, line 16 | delete "bytes;;" | insert --byte;-- |
| col. 13, line 19 | delete "bytes" | insert --byte-- |
| col. 14, line 06 | delete "bytes" | insert --byte-- |

Signed and Sealed this

Twenty-eighth Day of May, 1991

*Attest:*

HARRY F. MANBECK, JR.

*Attesting Officer*   *Commissioner of Patents and Trademarks*